(12) United States Patent
Hobbs et al.

(10) Patent No.: US 12,468,607 B1
(45) Date of Patent: Nov. 11, 2025

(54) USING A DATA PROCESSING UNIT TO SUPPORT A WITNESS SERVICE FOR A CLUSTER

(71) Applicant: DELL PRODUCTS L.P., Round Rock, TX (US)

(72) Inventors: Michael Hobbs, Austin, TX (US); Syama Poluri, Round Rock, TX (US); Ramesha He, Karnataka (IN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/660,009

(22) Filed: May 9, 2024

(51) Int. Cl.
*G06F 11/16* (2006.01)
*G06F 9/50* (2006.01)

(52) U.S. Cl.
CPC ........ *G06F 11/1658* (2013.01); *G06F 9/5088* (2013.01); *G06F 2201/805* (2013.01)

(58) Field of Classification Search
CPC ............. G06F 11/0709; G06F 11/1658; G06F 11/202; G06F 11/2023
See application file for complete search history.

(56) References Cited

U.S. PATENT DOCUMENTS

| | | | | |
|---|---|---|---|---|
| 2010/0211829 A1* | 8/2010 | Ziskind | ............... | G06F 11/0757 714/48 |
| 2014/0258771 A1* | 9/2014 | Xie | .................... | G06F 11/2005 714/4.11 |
| 2020/0036647 A1* | 1/2020 | Gupta | ..................... | H04L 67/10 |
| 2022/0215001 A1* | 7/2022 | P S | ...................... | G06F 11/2097 |
| 2023/0130435 A1* | 4/2023 | Salamon | ............... | G06F 3/0635 711/164 |

OTHER PUBLICATIONS

"Server Clustering and How It Works," Dec. 2, 2021, [online], [Retrieved Mar. 28, 2024]. Retrieved from Internet <URL: https://www.racksolutions.com/news/blog/server-cluster-how-it-works/> (7 pgs).

"What is Server Clustering & How Does it Work? + 3 Main Benefits," May 8, 2023, [online], [Retrieved Mar. 28, 2024]. Retrieved from Internet <URL: https://www.redswitches.com/blog/what-is-server-clustering/#How-Do-...2> (16pgs).

* cited by examiner

*Primary Examiner* — Michael Maskulinski
(74) *Attorney, Agent, or Firm* — BAUGH LAW, LLC

(57) ABSTRACT

In a clustered environment, compute nodes work together to provide high availability and reliability for applications and services. To keep the compute nodes synchronized, a cluster employs a witness service, which typically operates on a separate system. In addition to issues related to potential loss of the witness service, there are also issues of additional costs and overhead. In one or more embodiments, two or more compute nodes of a cluster include a data processing unit (DPU) system operating a witness service. For a compute node with a local DPU system that operates a local witness service, the local witness service handles data related to the local workload(s) and may synchronize with one or more remote witness services on remote DPUs in the cluster in the event of failure or other issues.

20 Claims, 11 Drawing Sheets

Compute Node Crashes

FIG. 6  Failover due to Witness Network Interruption

DPU/Witness Service Fails

USING A DATA PROCESSING UNIT TO SUPPORT A WITNESS SERVICE FOR A CLUSTER

BACKGROUND

A. Technical Field

The present disclosure relates generally to information handling systems. More particularly, the present disclosure relates to systems and methods for providing witness services in a cluster environment.

B. Background

The subject matter discussed in the background section shall not be assumed to be prior art merely as a result of its mention in this background section. Similarly, a problem mentioned in the background section or associated with the subject matter of the background section should not be assumed to have been previously recognized in the prior art. The subject matter in the background section merely represents different approaches, which in and of themselves may also be inventions.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In a cluster environment, a set of two or more information handling systems operate or function essentially as a single entity. Typically, they share an Internet Protocol (IP) address, and they process tasks (or workloads). A cluster is often used to perform functions such as reading/writing files, printing, accessing or managing databases, and messaging services. Information handling systems are clustered to help provide high availability.

Each information handling system in a cluster may be referred to as, or may be considered to comprise, a compute node (or simply, "node"). Each information handling system has its own compute-related resources (e.g., hard drive, RAM, network connections, processing, etc.), and may be capable of running/supporting one or more virtual machines. If one compute node within the cluster fails, the workload being handled by the failed/failing compute node may quickly and easily be transferred to another compute node in the cluster-thereby providing high availability by reducing or eliminating downtime and outages.

A witness service helps with the transfer of the workload between compute nodes in a cluster. For example, a witness service tracks the status of execution of the workload. Therefore, as the workload handling is passed between nodes, the witness service helps ensure that it is properly and fully completed. One problem, however, is that there is typically a single witness service that runs on a remote information handling system. If the information handling system on which the witness service runs becomes inoperable (e.g., crashes), the witness service for the cluster is lost. Also, if the witness service becomes inoperable (e.g., it needs to be updated), then the cluster is again left without a witness service.

Accordingly, it is highly desirable to find new ways to provide a witness service.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

Figure 1:
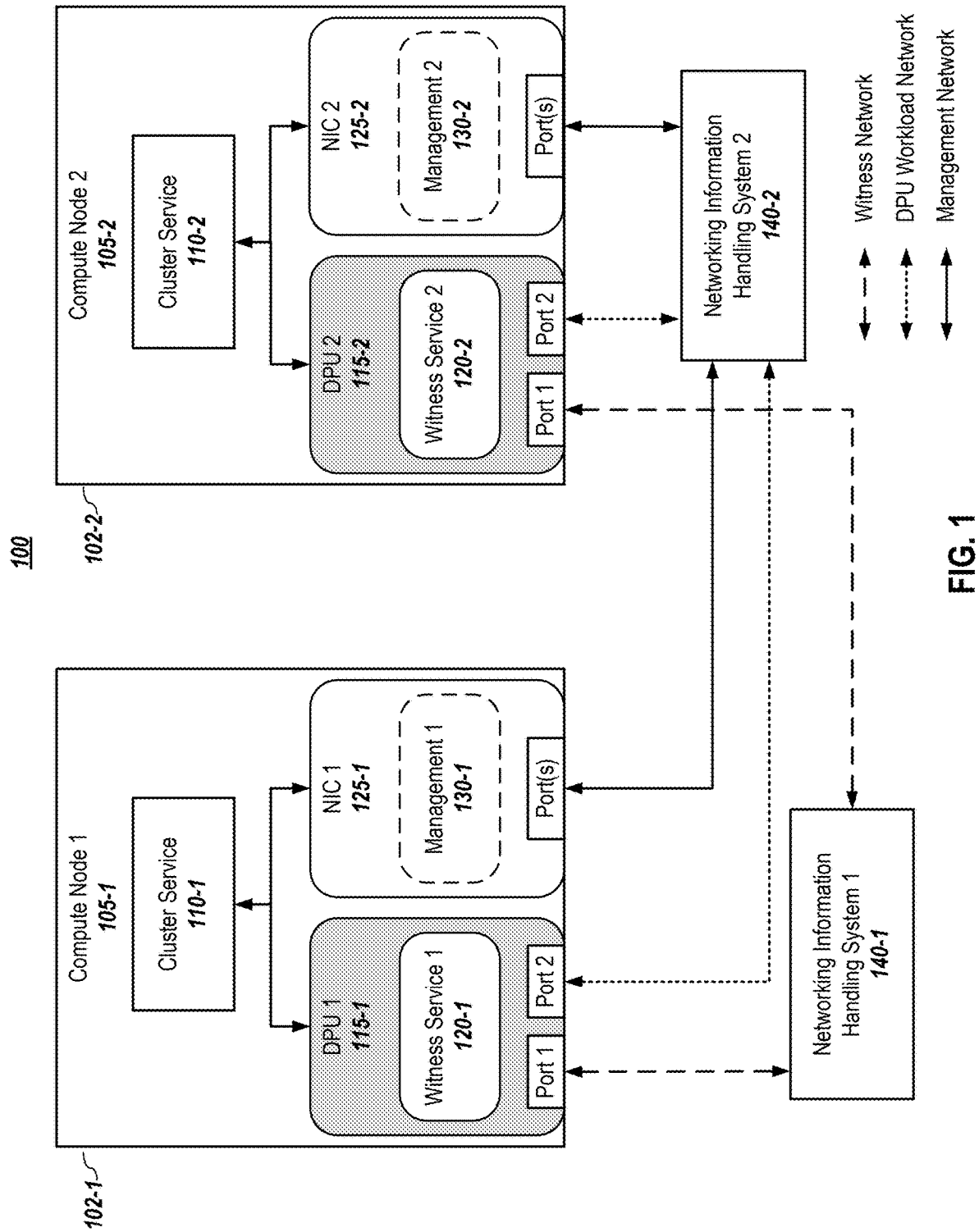
FIG. 1 depicts an example cluster environment, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," "comprising," and any of their variants shall be understood to be open terms, and any examples or lists of items are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); and (5) an acceptable outcome has been reached.

It shall also be noted that although embodiments described herein may be within the context of a two-node cluster, aspects of the present disclosure are not so limited. Accordingly, the aspects of the present disclosure may be applied or adapted for use in other contexts.

A. General Introduction

As noted above, a cluster environment typically comprises a set of two or more information handling systems that operate or function as a single entity. Clusters are very beneficial for a number of reasons, including but not limited to ensuring high availability, load balancing, and scaling.

If one compute node within the cluster fails, the workload being handled by the failed/failing compute node may quickly and easily be transferred to another compute node in the cluster—thereby providing high availability by reducing or eliminating downtime and outages.

To help facilitate high availability in a cluster, the cluster uses a witness service. A witness service in networking is a mechanism used in distributed systems, particularly in clusters. A witness service is an entity that observes and verifies events and actions within a cluster to ensure consistency, correctness, or fault tolerance. Given a distributed system, the witness service may be used to achieve consensus among multiple nodes by, for example, observing status of the nodes, observing agreement or disagreement between or among nodes, and verify consistency. Furthermore, in systems where redundancy is used, a witness service may monitor the health and status of components or nodes. The witness service may help determine the correct behavior when failures occur and ensure that the correct data exists and/or that redundant components are functioning properly. For example, a witness service may be used to track execution of a workload. Therefore, as the workload is passed between nodes, the witness service helps ensure that that it is properly and fully completed.

A witness service may also play a role in security-related tasks, such as monitoring network traffic for suspicious activities or verifying the integrity of cryptographic operations. Overall, the specific functionality and implementation of a witness service may vary depending on the requirements and architecture of the system in which it is deployed.

However, as noted above, one issue with current implementations of witness services is that there is a single witness service for a cluster, which typically runs on a remote information handling system. If the information handling system on which the witness service runs becomes inoperable (e.g., crashes), the witness service for the cluster is lost. Also, if the witness service becomes inoperable (e.g., it is being updated), the cluster is again left without a witness service.

If a workload is transferred to another compute node while the witness service is inoperable, it can create what is sometimes referred to as the "split-brain" problem. The "split-brain" problem in a cluster refers to a scenario where a cluster of compute nodes becomes divided or partitioned in such a way that communication between the nodes is disrupted or limited. This disruption can lead to various issues, including data inconsistency, service outages, and degraded performance.

In a clustered environment, nodes typically work together to provide high availability and reliability for applications and services. They communicate with each other to synchronize data and coordinate actions. However, if the cluster becomes split into separate segments due to network issues, hardware failures, or other factors, each segment may continue operating independently without awareness of the other segments. This situation can result in conflicting updates, data corruption, or other problems when the segments attempt to reconcile their states once the partition is resolved. To address the split-brain problem, a cluster employs a witness service to act as the judge or determiner of which segment is correct in order to resolve the partition issue.

In addition to the issues related to potential loss of the witness service, there are other issues of using a witness node, which may be on an additional sled/blade or an individual server, to arbitrate cluster resource ownership. First, this witness node represents additional equipment costs. Second, the witness node also represents additional operational overhead. For example, in addition to having to separately manage the witness node, developing and maintaining the witness node adds costs and development time to the overall solution. In addition, updating (e.g., firmware (FW) and/or software (SW)) the witness node creates an issue, as noted above, of potentially creating the split-brain problem while the witness node is updating. An alternative is to take the cluster offline. Finally, if the witness service is operating on one of the compute nodes, during routine server maintenance of that compute node, it results in a loss of the witness service since a power down of the compute node in the cluster brings down the cluster and the witness service. But, such action defeats the high availability purpose of the cluster node.

Accordingly, in one or more embodiments, each compute node of the cluster includes a data processing unit (DPU) system, which may be implemented as a blade, daughter card, or other type of subsystem of the information handling system of the compute node. Each DPU system is configured to operate a witness service rather than using an additional witness compute node. In one or more embodiments, the DPUs on the compute node are communicatively connected via one or more network connections to synchronize witness data. For an information handling system that operates as a compute node and includes a local DPU system operating a local witness service running on the local DPU system, the local witness service is responsible for synchronizing the data related to the workload(s) being handled by the compute node with the one or more remote witness services operating on corresponding one or more remote DPU systems in the cluster. In the event that a local compute node fails and recovers, a remote witness service operating on a remote DPU system can participate to resolve any split-brain scenario and keep the cluster alive.

In one or more embodiments, each DPU system may comprise its own power supply (e.g., can be placed on AUX (auxiliary) power) to ensure power for the DPU system and its witness service so that the witness service may continue to operate even if its corresponding compute node is powered down or crashes. For example, in one or more embodiments, the information handling system may comprise dual power supply units (PSUs) to provide redundancy with AUX power. With power coming from an AUX unit and the local DPU running a separate operating system (OS), in the event the local compute node's OS crashes or hangs, the local compute node can warm or cold reboot while the local witness service on the local DPU remains active.

B. System and Method Embodiments

1. Example System Embodiments

FIG. 1 depicts an example cluster environment, according to embodiments of the present disclosure. A cluster environment 100 typically comprises a set of two or more information handling systems 102. In the depicted embodiment, an information handling system 102 may comprise a compute node for operating in a cluster 100 with a peer compute node. For example, if compute node 1 105-1 is considered a local node, its peer or remote node in the cluster is compute node 105-2. In one or more embodiments, the information handling system or compute node may comprise the components of a typical information handling system, examples of which are described below in Section C. Among the system components, included but not limited to are one or more processors and a non-transitory computer-readable medium or media, communicatively coupled to the one or more processors of the compute node. The medium or media may comprise one or more sets of instructions which, when executed by at least one of the one or more processors, causes steps to be performed comprising supporting a local cluster service 110-1 related to a workload and may include detecting an operational state of a local data processing unit (DPU) 115-1.

Also depicted in the information handling system 102 is a DPU system 115 that is local to the information handling system. In one or more embodiments, the DPU system 115 may be a card, sled, blade, or computing system, which may comprise the components of a typical information handling system, examples of which are described below in Section C. For example, among other components, the DPU system may include, but is not limited to, one or more data processing units and a non-transitory computer-readable medium or media communicatively coupled to the one or more data processing units for performing one or more services. While not depicted, a DPU system (e.g., DPU1 and DPU2) are connected to one or more power supplies (e.g., a main PSU and auxiliary PSU) so that any compute node (e.g., host) shutdown, reboot, or update allows the DPU system and the witness service to remain operational. When a compute node is running, there is no data loss between it and a witness service because there is DPU with a witness service that is operational-whether local, remote, or both. Thus, no additional witness node is required to maintain cluster quorum.

Also depicted in the illustrated embodiment is a first port (Port 1) for connecting via a witness network to a remote DPU system 115-2 of the peer compute node 105-2, and a second port (Port 2) for connecting via a DPU workload network to the remote DPU system 115-2 of the peer compute node 105-2. The local DPU system may be configured to operate a local witness service 120-1 that synchronizes data related to the workload with a remote witness service 120-2 operating on the remote DPU system 115-2 of the peer compute node 105-2.

Embodiments bring the responsibility of the witness service to the DPU systems (e.g., DPU1 115-1 and DPU2 115-2) as the witness service. In the depicted embodiment, Port 1 of DPU1 and Port 1 of DPU2 are connected via one or more networking information handling systems (e.g., networking information handling system 140-1) to synchronize the witness data. And, in the depicted embodiment, Port 2 of DPU1 and Port 2 of DPU2 are connected via one or more networking information handling systems (e.g., networking information handling system 140-2), in which the connection is used for communicating data for the workload and other operations.

In one or more embodiments, the information handling system 102-1 may further comprise a local network interface card (NIC) 125-1 that includes one or more ports for connecting via a management network to a remote NIC 125-2 of the peer compute node.

As will be explained in more detail below, method embodiments use one or more of the connections shown in FIG. 1 to eliminate the need for a third compute node as a witness.

2. Example Method Embodiments a) Compute Node Not Operational Embodiments

Figure 2:
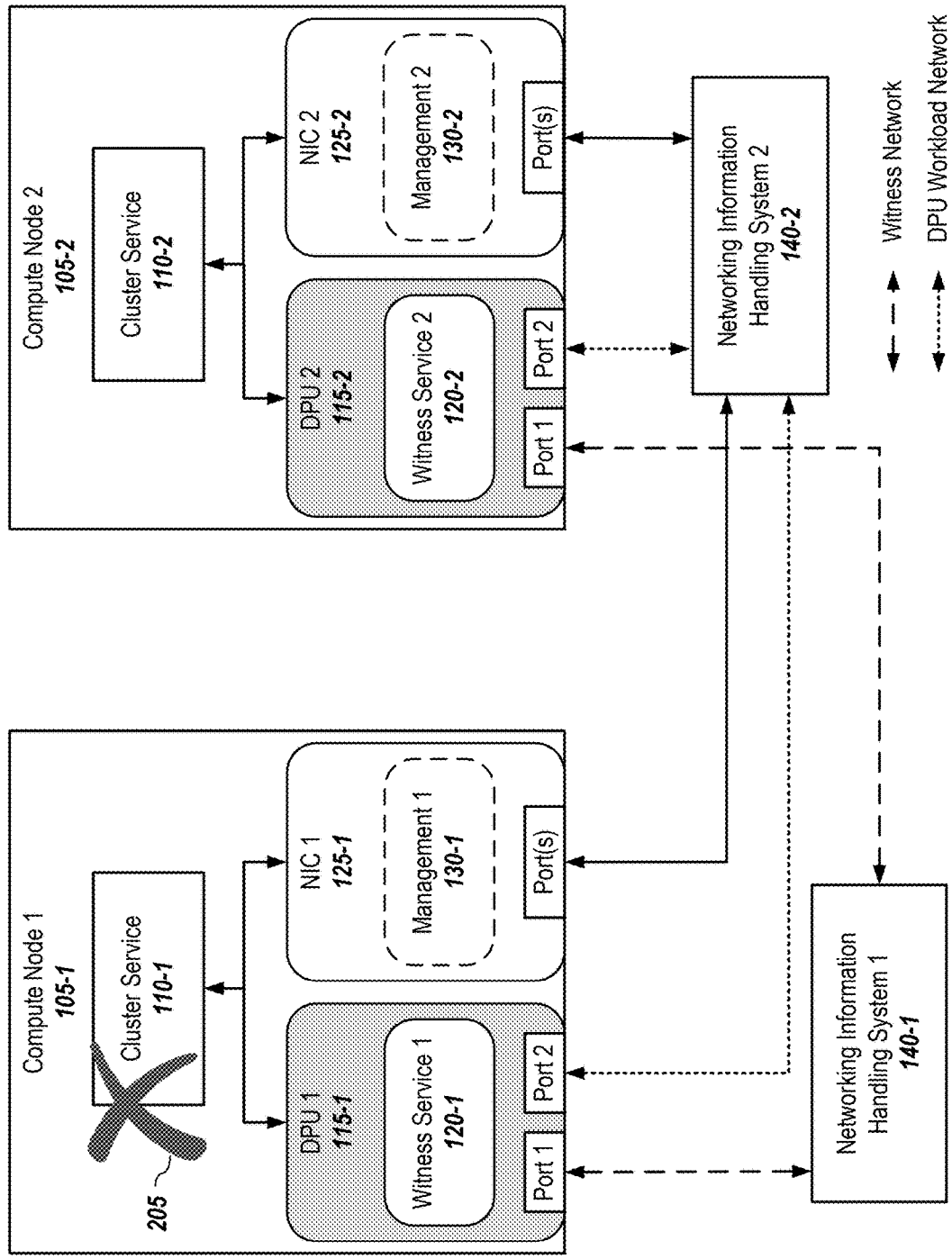
FIG. 2 depicts the example cluster environment of FIG. 1 in which a compute node becomes nonoperational, according to embodiments of the present disclosure.
Figure 3:
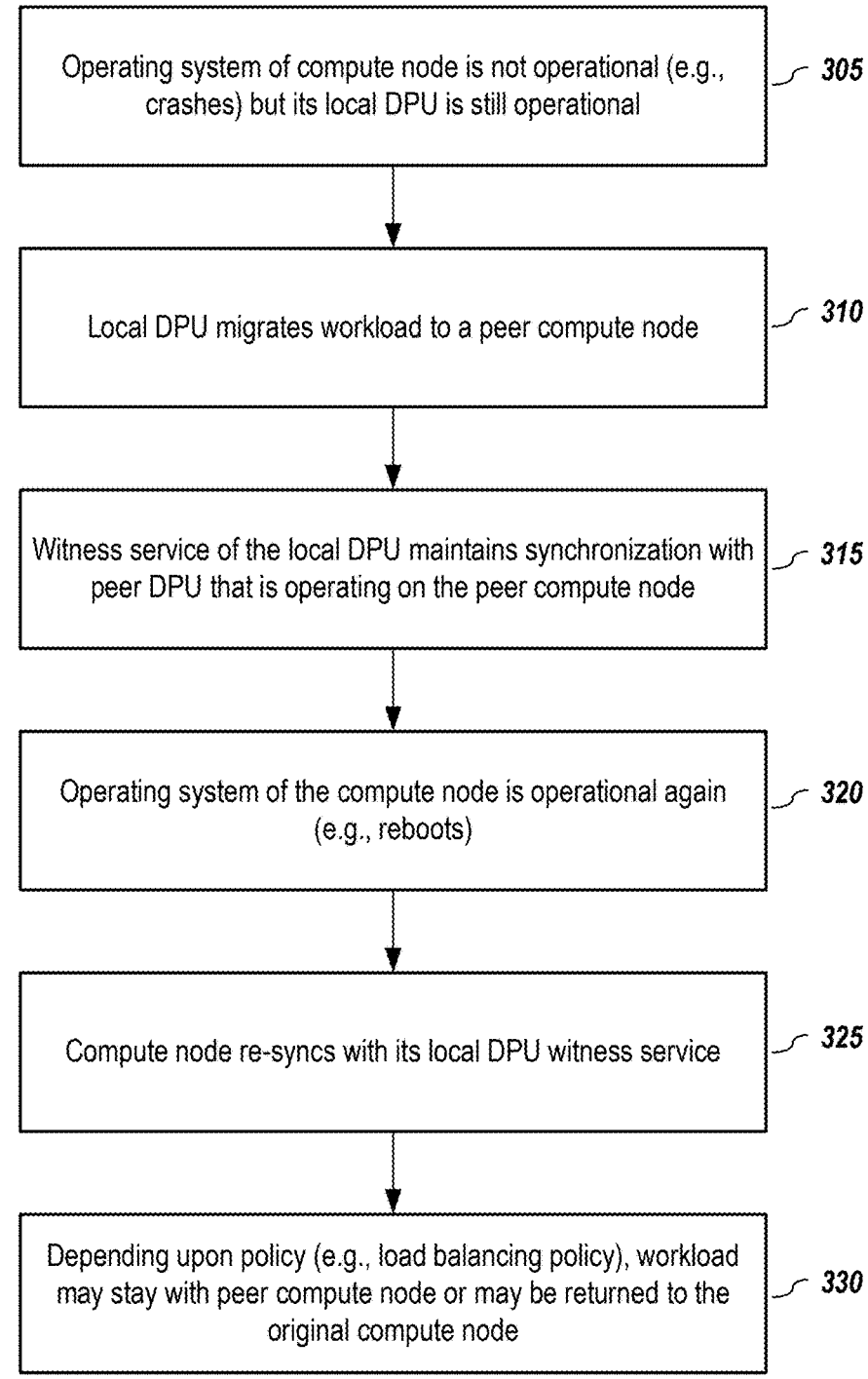
FIG. 3 depicts an example methodology for handling when a compute node becomes nonoperational, according to embodiments of the present disclosure.

FIG. 2 depicts the example cluster environment of FIG. 1 in which a compute node becomes nonoperational 205, according to embodiments of the present disclosure. FIG. 3 depicts an example methodology for handling when a compute node becomes nonoperational, according to embodiments of the present disclosure.

In one or more embodiments, one of the compute nodes (e.g., compute node 1 105-1, in this example) becomes (305) nonoperational for some reasons. For example, the operating system of the compute node 105-1 crashes or is updating 205, but its local DPU 115-1 is still functioning. Responsive to the local DPU system (i.e., DPU 1) or the local witness service (i.e., witness service 1) detecting that its cluster service 110-1 is not operational, the following steps may be performed.

Handling of the workload may be migrated (310) from the local cluster service 110-1 to the peer compute node 105-2. That is, the workload of the nonoperational compute node may be transferred to the peer compute node, thereby maintaining high availability. In one or more embodiments, the local DPU may perform the migrating of the workload to the peer compute node (i.e., migrating the handling of the workload to the remote cluster service 110-2).

To ensure that there is proper monitoring and handling of the workload, the local witness service 120-1 maintains (315) synchronizing of witness service data related to the workload with the remote witness service 120-2 operating on the remote DPU system (i.e., DPU2 115-2) at the peer compute node 105-2.

After the compute node 105-1 resumes operating (320) (e.g., reboots), the compute node (or its cluster service) re-synchronizes (325) with its local DPU witness service 120-1. In one or more embodiments, depending upon policy (e.g., a load balancing policy), the workload may remain with the peer compute node 105-2 or may be returned to the original compute node 105-1.

b) Data Processing Unit (DPU) System Update Embodiments

Figure 4:
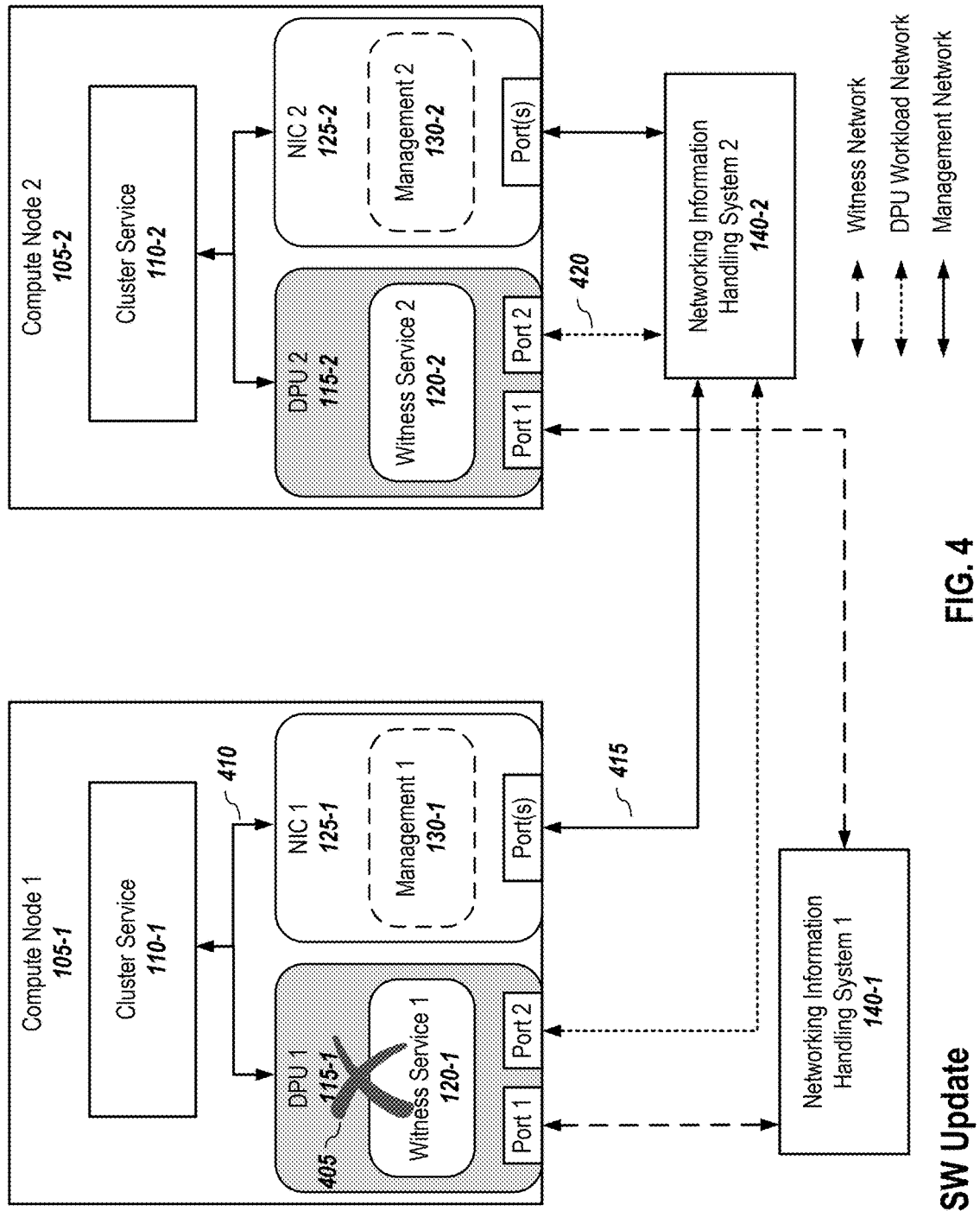
FIG. 4 depicts the example cluster environment of FIG. 1 in which a DPU system becomes nonoperational due to an update, according to embodiments of the present disclosure.
Figure 5:
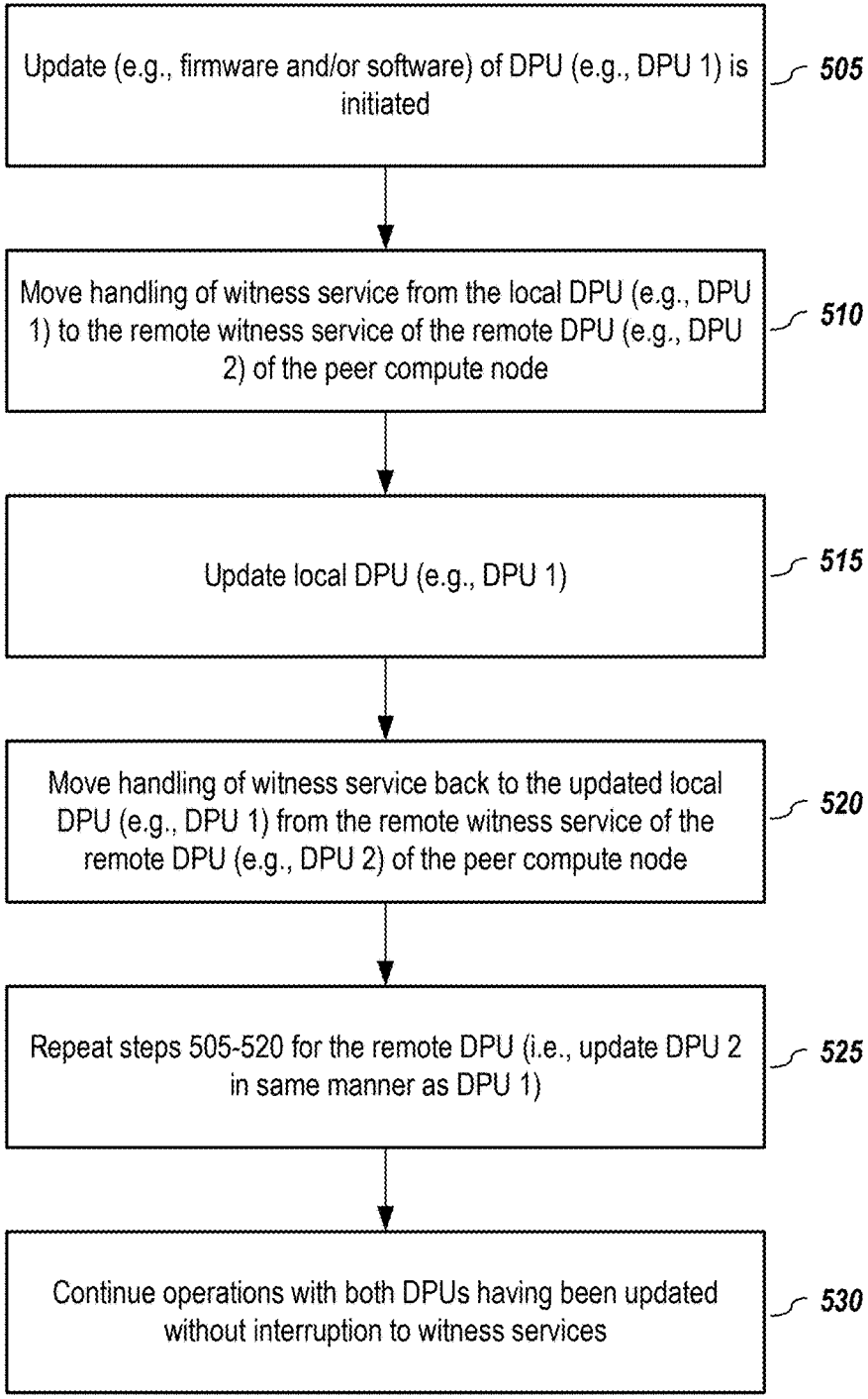
FIG. 5 depicts an example methodology for handling when a DPU system becomes nonoperational, according to embodiments of the present disclosure.

FIG. 4 depicts the example cluster environment of FIG. 1 in which a DPU system becomes nonoperational due to an update, according to embodiments of the present disclosure. FIG. 5 depicts an example methodology for handling when a DPU system becomes nonoperational, according to embodiments of the present disclosure.

In one or more embodiments, responsive to the initiation (505) of an update of firmware, software, or both for a DPU system (e.g., DPU 1 115-1 in FIG. 4, in this example), the DPU system and its witness service are or will become nonoperational during the update process. The handling of the witness service or services related to the workload for this computer node (i.e., compute node 1 105-1) may be migrated (510) from the local witness service 120-1 to the remote witness service 120-2 operating on the remote DPU system 115-2 of the peer compute node 105-2. In one or more embodiments, the migration may be performed by the local DPU system or local witness service in preparation for the update. Additionally, or alternatively, the local cluster service 110-1 may coordinate the migration in preparation for the update or as a result of the cluster service not detecting the local DPU system or the local witness service being operational due to the update.

In one or more embodiments, while the local DPU system 115-1 is nonoperational, a local network interface card (NIC) 125-1, which may include one or more ports for connecting (e.g., via a management network 415 and 420) to a remote NIC 125-2 of the peer compute node 105-2, may be used to communicate between the compute nodes 105. For example, in one or more embodiments, migration of handling of the witness service or services related to the workload from the local witness service 120-1 to the remote witness service 1200-2 operating on the remote DPU system of the peer compute node may involve communicating via the local NIC 125-1 and at least part of the management network (e.g., link 415 and network information handling system 140-2) while the local DPU system 115-1 and its ports are down during the update process. In one or more embodiments, the NIC may support the enablement of or use of one or more management services or workloads 130-1.

The local DPU system updates (515). Following completion of the update, the handling of the witness service for the workload may be migrated (520) back to the local DPU (e.g., DPU 1), which is now updated, from the remote witness service 120-2 of the remote DPU system 115-2 of the peer compute node 105-2. Concerning the migration back following the update, in one or more embodiments, the updated local DPU system may request migration from the remote/peer compute node (e.g., request migration of the handling of the witness service for the workload from the remote DPU system 115-2 or from the remote witness service 120-2). Additionally, or alternatively, the local cluster service 110-1 may detect that its local DPU system 115-1 is now operational (i.e., the update has completed) and may switch its witness service from the remote witness service 120-2 to its local witness service 120-1. In one or more embodiments, the transfer back may include synchronizing with the remote DPU system (or its witness service).

In one or more embodiments, steps 505-520 may be repeated (525) for updating of the other DPU system. Note that the elements (e.g., cluster service 110-2, DPU system 115-2, witness service 120-2, NIC 125, etc.) for the other compute node (i.e., compute node 105-2) are local elements relative to it and the other compute node's 105-1 elements are remote to it.

Once all updates are completed, the cluster 400 may continue operations with both DPUs having been updated—without interruption, including no interruption to witness services, for the cluster.

c) Witness Network Failover Embodiments

Figure 6:
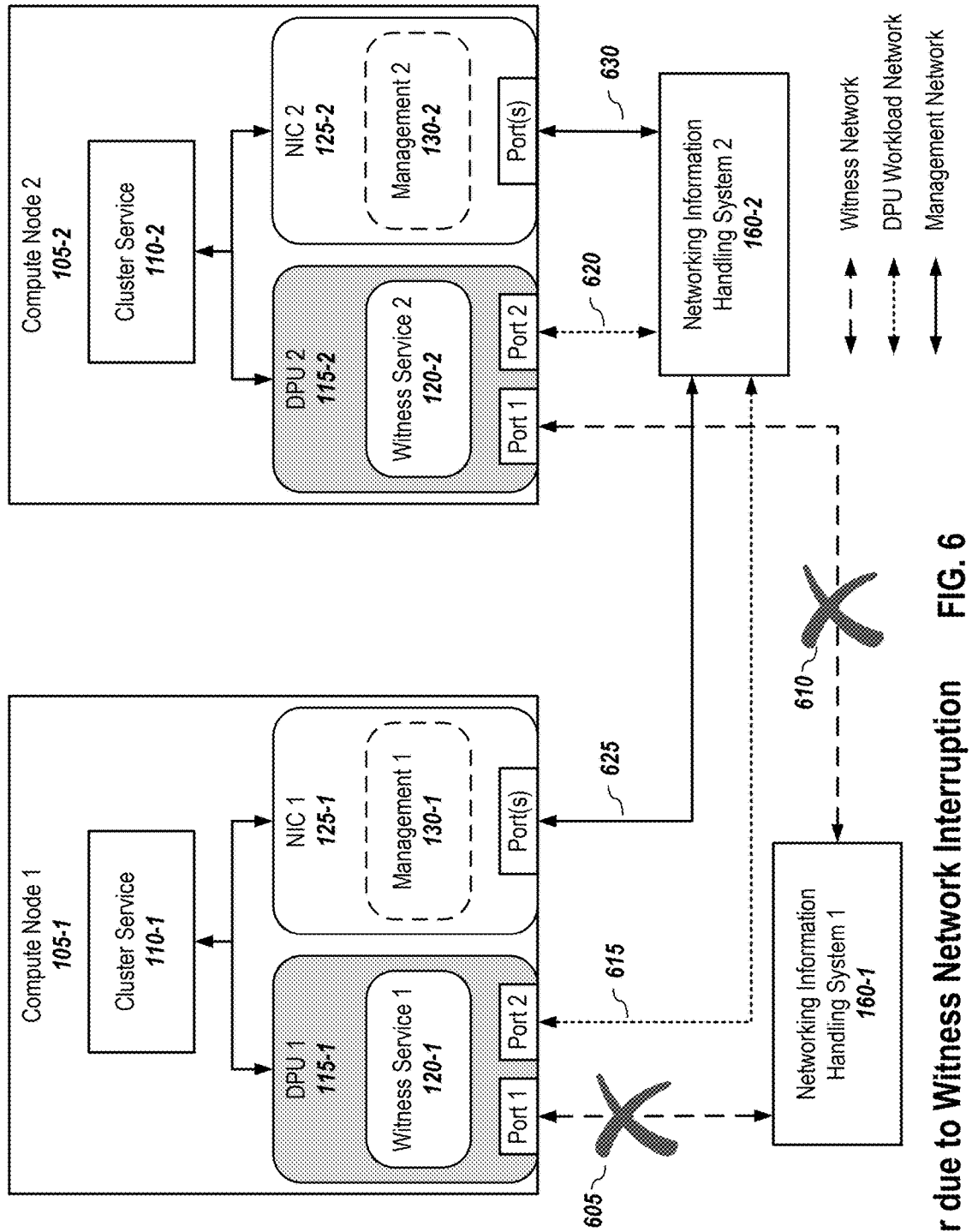
FIG. 6 depicts the example cluster environment of FIG. 1 in which there has been an interruption in connectivity between DPUs/witness services, according to embodiments of the present disclosure.
Figure 7:
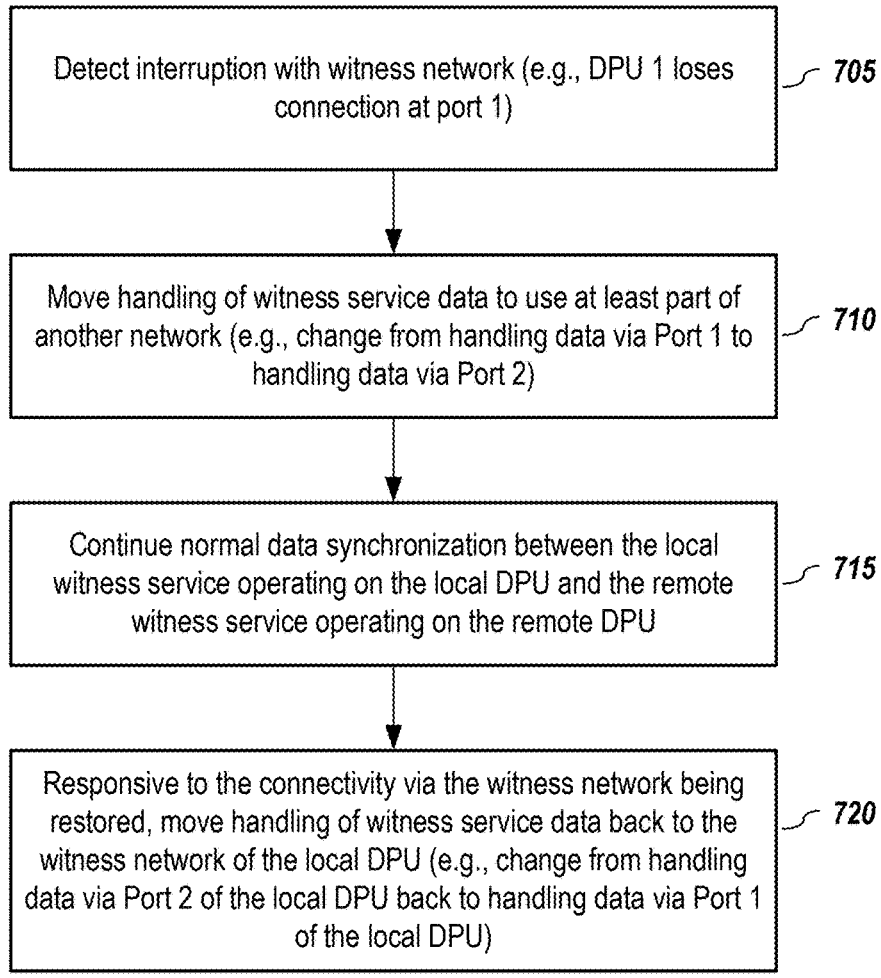
FIG. 7 depicts an example methodology for handling when there has been an interruption in connectivity between DPUs/witness services, according to embodiments of the present disclosure.

FIG. 6 depicts the example cluster environment of FIG. 1 in which there has been an interruption in connectivity between DPUs/witness services, according to embodiments of the present disclosure. FIG. 7 depicts an example methodology for handling when there has been an interruption in connectivity between DPUs/witness services, according to embodiments of the present disclosure.

As illustrated in FIG. 6, assume that there has been some interruption in the witness network between DPU 1 115-1 and DPU 2 115-2. The interruption may be a result of one or more of the links, such as link 605 and/or link 610, failing. Alternatively, or additionally, the one or more networking devices (e.g., networking information handling system 160-1), which support the witness network communication pathway may have become nonoperational or may have malfunctioned. In any event, connectivity between the DPUs has been interrupted.

In one or more embodiments, responsive to the local witness service or the local DPU system detecting (705) an interruption in communicating with the remote witness service via the witness network, handling of witness service data related to a workload may be migrated (710) to another network connection. For example, in one or more embodiments, the data may be transitioned by the local cluster service 110, the local DPU system 115, and/or a witness service 120 to use at least part of a different network or differently designated network. In the example shown in FIG. 6, the data may be communicated via Port 2 of the local DPU 1 to the DPU workload network, including via networking information handling system 160-2 and connection 620.

Note that if both Port 1 and Port 2 of DPU 1 had connectivity issues, the data may be communicated via NIC 1 and at least part of the management network 625. Depending upon what is active at the other compute node 105-2, the data may be communicated from the network information handling system 160-2 via connection 620 directly to DPU 2 or may traverse via connection 630 and NIC 2 125-2 to finally arrive at the peer witness service 120-2.

Since connectivity between the witness services has been maintained, normal data synchronization between the local witness service operating on the local DPU and the remote witness service operating on the remote DPU may continue (715).

In one or more embodiments, responsive to the connectivity via the witness network being restored, the handling of the witness service data may be moved (720) back to the witness network of the local DPU. For example, the handling of data via Port 2 of the local DPU or via the NIC may be moved back to being communicated via Port 1 of the local DPU.

d) DPU System and/or Witness Service Failure Embodiments

Figure 8:
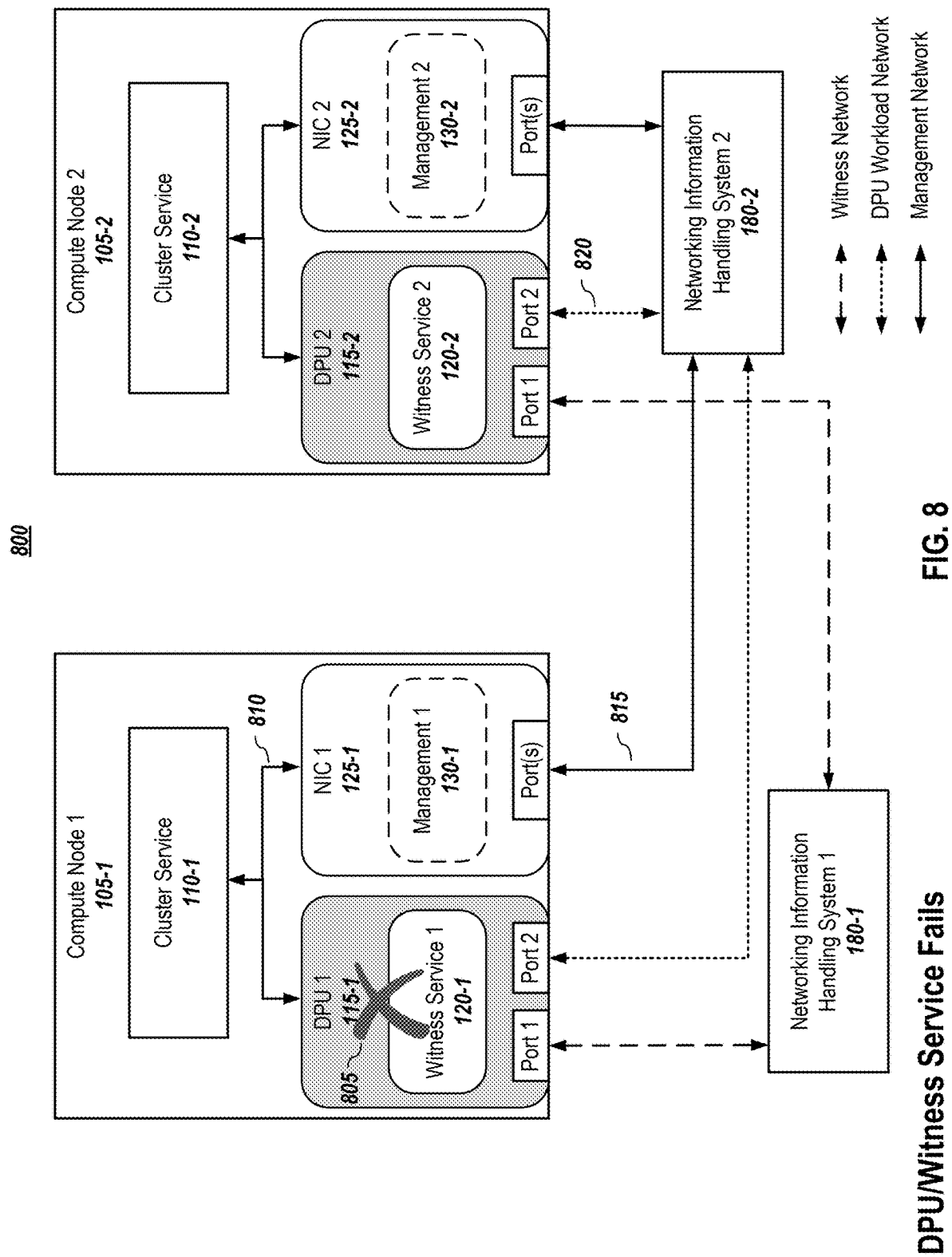
FIG. 8 depicts the example cluster environment of FIG. 1 in which a DPU system and/or a witness service becomes nonoperational, according to embodiments of the present disclosure.
Figure 9:
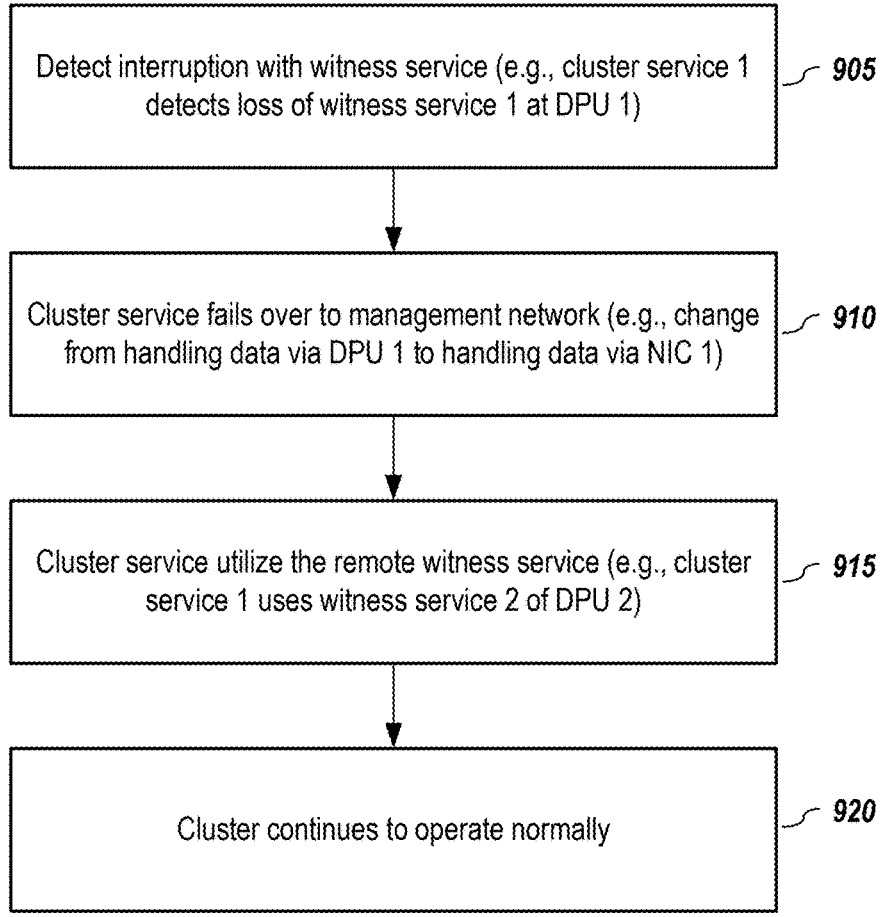
FIG. 9 depicts an example methodology for handling such scenarios, according to embodiments of the present disclosure.

FIG. 8 depicts the example cluster environment of FIG. 1 in which a DPU system and/or a witness service becomes nonoperational, according to embodiments of the present disclosure. FIG. 9 depicts an example methodology for handling such scenarios, according to embodiments of the present disclosure.

In one or more embodiments, an interruption 805 with the witness service is detected (905) by the local DPU system, by the cluster service, or both depending upon the situation and/or embodiment. For example, the witness service (e.g., witness service 1 120-1 of DPU 1 115-1 in FIG. 8, in this example) may be down or stalled, or the DPU system 115-1 on which it operates may have crashed or may be down for some reason. In any event, the local witness service 120-1 is not accessible/operational.

In one or more embodiments, the cluster service 110-1 fails over (910) to the management network (e.g., change from handling data DPU 1 to handling data via NIC 1). Since the local witness service 120-1 is nonoperational, the local cluster service 110-1 may utilize (915) the remote witness service 120-2 of the remote DPU system 115-2 on the peer compute node 105-2. Because of the redundancy provided by the remote witness service 120-2, the cluster service 110-1 of compute node 105-1 may continue (920) to operate normally.

While not depicted in FIG. 9, responsive to the local DPU system 115-1 and/or the local cluster service 110-1 detecting the local witness service 120-1 being operational, the witness service for the compute node 105-1 may be transferred back to the local witness service 120-1. The transfer may include or require the local witness service to re-synchronize with the remote witness service 120-2 prior to it 120-1 resuming the role for its local compute node.

C. Information Handling System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices. The computing system may also include one or more buses operable to transmit communications between the various hardware components.

Figure 10:
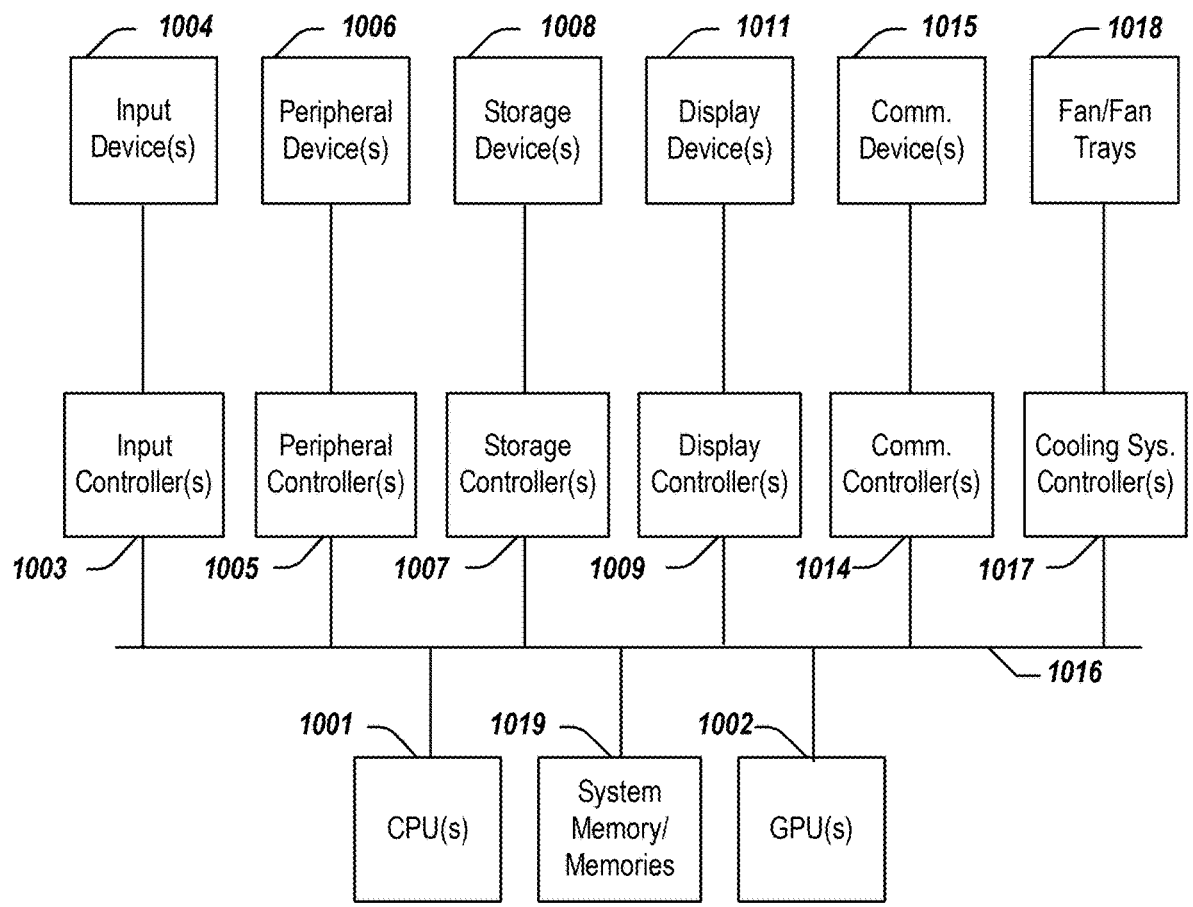
FIG. 10 depicts a simplified block diagram of an information handling system, according to embodiments of the present disclosure.

FIG. 10 depicts a simplified block diagram of an information handling system (or computing system), according to embodiments of the present disclosure. It will be understood that the functionalities shown for system 1000 may operate to support various embodiments of a computing system—although it shall be understood that a computing system may be differently configured and include different components, including having fewer or more components as depicted in FIG. 10.

As illustrated in FIG. 10, the computing system 1000 includes one or more CPUs 1001 that provides computing resources and controls the computer. CPU 1001 may be implemented with a microprocessor or the like and may also include one or more graphics processing units (GPU) 1002 and/or a floating-point coprocessor for mathematical computations. In one or more embodiments, one or more GPUs 1002 may be incorporated within the display controller 1009, such as part of a graphics card or cards. In one or more embodiments, the system may alternatively or additionally include one or more data processing units (DPUs) (not shown). In the realm of data centers and cloud computing, a DPU refers to a specialized processing unit designed to accelerate data processing tasks. DPUs are typically optimized for handling data-centric workloads such as networking, storage, security, and other tasks related to data processing and manipulation. DPUs often offload specific tasks from a main CPU, allowing for improved performance, efficiency, and scalability in data-intensive applications. They may include specialized hardware components and dedicated software to efficiently process and manage data flows within a system. The system 1000 may also include a system memory 1019, which may comprise RAM, ROM, or both.

A number of controllers and peripheral devices may also be provided, as shown in FIG. 10. An input controller 1003 represents an interface to various input device(s) 1004, such as a keyboard, mouse, touchscreen, stylus, microphone, camera, trackpad, display, etc. The computing system 1000 may also include a storage controller 1007 for interfacing with one or more storage devices 1008 each of which includes a storage medium such as magnetic tape or disk, or an optical medium that might be used to record programs of instructions for operating systems, utilities, and applications, which may include embodiments of programs that implement various aspects of the present disclosure. Storage device(s) 1008 may also be used to store processed data or data to be processed in accordance with the disclosure. The system 1000 may also include a display controller 1009 for providing an interface to a display device 1011, which may be a cathode ray tube (CRT) display, a thin film transistor (TFT) display, organic light-emitting diode, electroluminescent panel, plasma panel, or any other type of display. The computing system 1000 may also include one or more peripheral controllers or interfaces 1005 for one or more peripherals 1006. Examples of peripherals may include one or more printers, scanners, input devices, output devices, sensors, and the like. A communications controller 1014 may interface with one or more communication devices 1015, which enables the system 1000 to connect to remote devices through any of a variety of networks including the Internet, a cloud resource (e.g., an Ethernet cloud, a Fibre Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 1000 comprises one or more fans or fan trays 1018 and a cooling subsystem controller or controllers 1017 that monitors thermal temperature(s) of the system 1000 (or components thereof) and operates the fans/fan trays 1018 to help regulate the temperature.

In the illustrated system, all major system components may connect to a bus 1016, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 11:
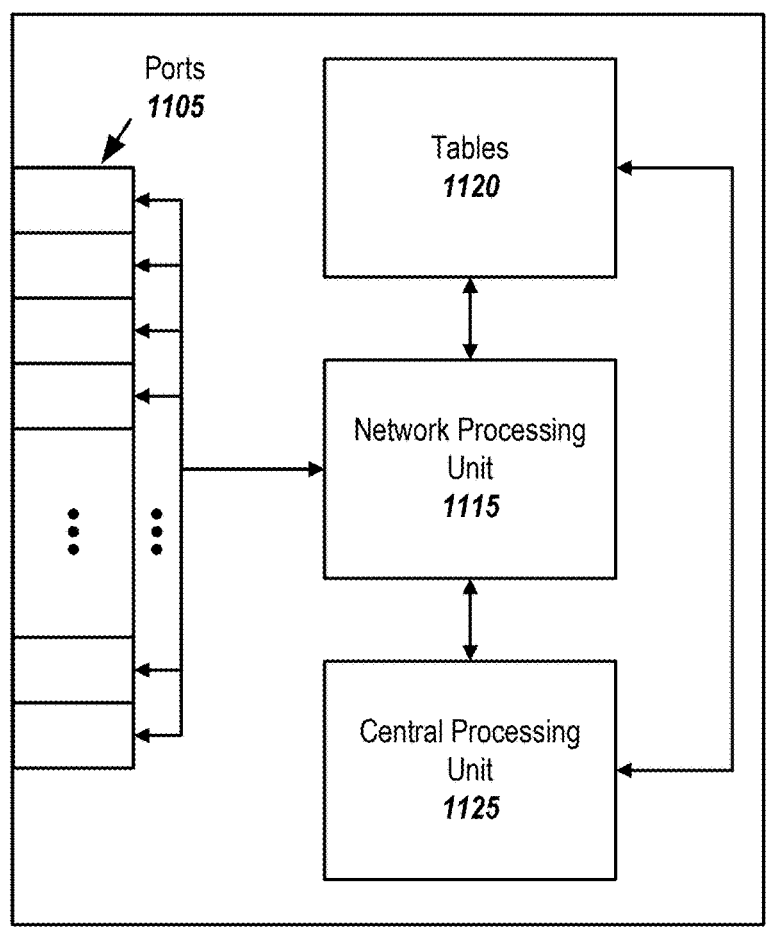
FIG. 11 depicts an alternative block diagram of an information handling system, according to embodiments of the present disclosure.

FIG. 11 depicts an alternative block diagram of an information handling system, according to embodiments of the present disclosure. It will be understood that the functionalities shown for system 1100 may operate to support various embodiments of the present disclosure although it shall be understood that such system may be differently configured and include different components, additional components, or fewer components.

The information handling system 1100 may include a plurality of I/O ports 1105, a network processing unit (NPU) 1115, one or more tables 1120, and a CPU 1125. The system includes a power supply (not shown) and may also include other components, which are not shown for sake of simplicity.

In one or more embodiments, the I/O ports 1105 may be connected via one or more cables to one or more other network devices or clients. The network processing unit 1115 may use information included in the network data received at the node 1100, as well as information stored in the tables 1120, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media comprising one or more sequences of instructions, which, when executed by one or more processors or processing units, causes steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that has computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as compact discs (CDs) and holographic devices; magneto-optical media; and hardware devices that are specially configured to store or to store and execute program code, such as ASICs, PLDs, flash memory devices, other non-volatile memory devices (such as 3D XPoint-based devices), ROM, and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated by those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claim or claims may be arranged differently including having multiple dependencies, configurations, and combinations.

What is claimed is:

1. An information handling system comprising:
a compute node for operating in a cluster with a peer compute node comprising:
one or more processors; and
a non-transitory computer-readable medium or media, communicatively coupled to the one or more processors of the compute node, comprising one or more sets of instructions which, when executed by at least one of the one or more processors, causes steps to be performed comprising:
performing a local cluster service related to a workload, including detecting an operational state of a local data processing unit (DPU); and
the local DPU system comprising:
one or more data processing units;
a non-transitory computer-readable medium or media communicatively coupled to the one or more data processing units of the local DPU system;
a first port for connecting via a witness network to a remote DPU system of the peer compute node; and
a second port for connecting via a DPU workload network to the remote DPU system of the peer compute node;
wherein the local DPU system is configured to operate a local witness service that synchronizes data related to the workload with a remote witness service operating on the remote DPU system of the peer compute node.

2. The information handling system of claim 1 wherein the local DPU system is further configured to cause steps to be performed comprising:
responsive to the local DPU system detecting that the local cluster service is not operational:
migrating handling of the workload from the local cluster service to the peer compute node; and
maintaining synchronizing of witness service data related to the workload with the remote witness service operating on the remote DPU system at the peer compute node.

3. The information handling system of claim 1:
wherein the local DPU system is further configured to cause steps to be performed:
responsive to the local DPU system detecting that the compute node is operational, synchronizing with the compute node, via the local witness service of the local DPU system, data related to the workload; and
wherein the local cluster service or the local DPU system is further configured to cause steps to be performed:
determining, based upon a cluster policy, whether to migrate handling of the workload from the peer compute node to the compute node or to keep the workload being handled by the peer compute node.

4. The information handling system of claim 1 wherein the local cluster system is further configured to cause steps to be performed:
responsive to initiation of an update of firmware, software, or both for the local DPU system, migrating handling of a witness service or services related to the workload from the local witness service to the remote witness service operating on the remote DPU system of the peer compute node; and
following completion of the update of the local DPU system, migrating handling of the witness service or services related to the workload from the remote witness service to the local witness service operating on the updated local DPU system.

5. The information handling system of claim 4:
wherein the information handling system further comprises a local network interface card (NIC) comprising one or more ports for connecting via a management network to a remote NIC of the peer compute node; and
wherein the step of migrating handling of a witness service or services related to the workload from the local witness service to the remote witness service operating on the remote DPU system of the peer compute node comprises:
communicating via the local NIC and at least part of the management network.

6. The information handling system of claim 4 wherein the local DPU system is further configured to cause steps to be performed:
receiving migration of handling of a witness service or services related to a workload from the remote witness service to the local witness service operating on the local DPU system of the peer compute node; and
following completion of update of the remote DPU system, migrating handling of witness service related to the workload from the local witness service on the local DPU system back to the remote witness service operating on the updated remote DPU system.

7. The information handling system of claim 1 wherein the local DPU system is further configured to cause steps to be performed:
responsive to the local witness service or the local DPU system detecting an interruption in communicating with the remote witness service via the witness network, migrating handling of witness service data to at least part of the DPU workload network of the local DPU system that connects the local witness service operating on the local DPU system with the remote witness service operating on the remote DPU system.

8. The information handling system of claim 1 wherein the local cluster system is further configured to cause steps to be performed:
   detecting, via a local cluster service of the compute node, an interruption with the local witness service of the local DPU;
   causing the local cluster service to communicate via a network connection with the remote witness service operating on the remote DPU of the peer compute node; and
   utilizing the remote witness service for the compute node instead of using the local witness service.

9. The information handling system of claim 8:
   wherein the information handling system further comprises a local network interface card (NIC) comprising one or more ports for connecting via a management network to a remote NIC of the peer compute node; and
   wherein the step of causing the local cluster service to communicate via a network connection with the remote witness service operating on the remote DPU of the peer compute node comprises:
      communicating via the local NIC and at least part of the management network.

10. An information handling system comprising:
    a compute node comprising:
       one or more processors; and
       a non-transitory computer-readable medium or media comprising one or more sets of instructions which, when executed by at least one of the one or more processors, causes steps to be performed comprising:
          performing one or more cluster services related to a workload; and
    a local DPU system, which is coupled to the compute node system, comprising:
       one or more processors; and
       a non-transitory computer-readable medium or media comprising one or more sets of instructions which, when executed by at least one of the one or more processors, causes steps to be performed comprising:
          detecting an operational state of the compute node; and
          operating a local witness service that synchronizes data related to the workload with a remote witness service operating on a remote DPU of a peer compute node.

11. The information handling system of claim 10 wherein the non-transitory computer-readable medium or media of the local DPU further comprises one or more sequences of instructions which, when executed by at least one of the one or more processors, causes steps to be performed comprising:
    responsive to the local DPU detecting that the compute node is not operational:
       migrating handling of the workload from the compute node to the peer compute node; and
       maintaining synchronizing of data related to the workload with the remote DPU operating on the peer compute node.

12. The information handling system of claim 10:
    wherein the non-transitory computer-readable medium or media of the local DPU further comprises one or more sequences of instructions which, when executed by at least one of the one or more processors, causes steps to be performed comprising:
       responsive to the local DPU detecting that the compute node is operational, synchronizing, via the local witness service of the local DPU, with the compute node of data related to the workload; and
    wherein the non-transitory computer-readable medium or media of the local DPU or the non-transitory computer-readable medium or media of the compute node further comprises one or more sequences of instructions which, when executed by at least one of the one or more processors, causes steps to be performed comprising:
       determining, based upon a cluster policy, whether to migrate handling of the workload from the peer compute node to the compute node or to keep the workload being handled by the peer compute node.

13. The information handling system of claim 10 wherein the non-transitory computer-readable medium or media of the local DPU or the non-transitory computer-readable medium or media of the compute node further comprises one or more sequences of instructions which, when executed by at least one of the one or more processors, causes steps to be performed comprising:
    responsive to initiation of an update of firmware, software, or both for the local DPU system, migrating handling of witness service related to the workload from the local witness service to the remote witness service operating on the remote DPU of the peer compute node; and
    following completion of the update of the local DPU, migrating handling of witness service related to the workload from the remote witness service to the local witness service operating on the updated local DPU.

14. The information handling system of claim 13 wherein the non-transitory computer-readable medium or media of the local DPU or the non-transitory computer-readable medium or media of the compute node further comprises one or more sequences of instructions which, when executed by at least one of the one or more processors, causes steps to be performed comprising:
    receiving migration of handling of witness service related to a workload from the remote witness service to the local witness service operating on the local DPU of the peer compute node; and
    following completion of update of the remote DPU, migrating handling of witness service related to the workload from the local witness service on the local DPU back to the remote witness service operating on the updated remote DPU.

15. The information handling system of claim 10 wherein the non-transitory computer-readable medium or media of the local DPU further comprises one or more sequences of instructions which, when executed by at least one of the one or more processors, causes steps to be performed comprising:
    responsive to the local witness service or the local DPU detecting an interruption in communicating with the remote witness service, migrating handling of witness service data to a secondary network of the local DPU that connects the local witness service operating on the local DPU with the remote witness service operating on the remote DPU.

16. The information handling system of claim 10:
wherein the information handling system further comprises a local network interface card (NIC) comprising one or more ports for connecting via a network to the peer compute node; and
wherein non-transitory computer-readable medium or media of the local DPU or the non-transitory computer-readable medium or media of the compute node further comprises one or more sequences of instructions which, when executed by at least one of the one or more processors, causes steps to be performed comprising:
  detecting, via a local cluster service of the compute node, an interruption with the local witness service of the local DPU;
  causing the local cluster service to communicate via the local NIC with the remote witness service operating on the remote DPU of the peer compute node; and
  utilizing the remote witness service for the compute node instead of using the local witness service.

17. A processor-implemented method comprising:
detecting, using a local data processing unit (DPU) of an information handling system, an operational state of the information handling system operating as a compute node, which performs one or more cluster services related to a workload; and
operating, using the local DPU, a local witness service that synchronizes data related to the workload with a remote witness service operating on a remote DPU of a peer compute node.

18. The processor-implemented method of claim 17 further comprising:
responsive to the local DPU detecting that the compute node is not operational:
  migrating handling of the workload from the compute node to the peer compute node; and
  maintaining synchronizing of data related to the workload with the remote DPU operating on the peer compute node.

19. The processor-implemented method of claim 18 wherein:
responsive to the local DPU detecting that the compute node is operational, synchronizing, via the local witness service of the local DPU, with the compute node of data related to the workload; and
determining, based upon a cluster policy, whether to migrate handling of the workload from the peer compute node to the compute node or to keep the workload being handled by the peer compute node.

20. The processor-implemented method of claim 17 wherein:
responsive to initiation of an update of firmware, software, or both for the local DPU system, migrating handling of witness service related to the workload from the local witness service to the remote witness service operating on the remote DPU of the peer compute node; and
following completion of the update of the local DPU, migrating handling of witness service related to the workload from the remote witness service to the local witness service operating on the updated local DPU.

\* \* \* \* \*